United States Patent
Fujiwara et al.

(10) Patent No.: US 11,807,211 B2
(45) Date of Patent: *Nov. 7, 2023

(54) CONTROL APPARATUS FOR IN-VEHICLE APPARATUS

(71) Applicant: Hitachi Astemo, Ltd., Hitachinaka (JP)

(72) Inventors: Shota Fujiwara, Hitachinaka (JP); Kazuya Yamano, Hitachinaka (JP); Masaki Itabashi, Hitachinaka (JP); Toshiaki Meguro, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 257 days.

This patent is subject to a terminal disclaimer.

(21) Appl. No.: 17/418,591

(22) PCT Filed: Dec. 20, 2019

(86) PCT No.: PCT/JP2019/050046
§ 371 (c)(1),
(2) Date: Jun. 25, 2021

(87) PCT Pub. No.: WO2020/137858
PCT Pub. Date: Jul. 2, 2020

(65) Prior Publication Data
US 2022/0063643 A1    Mar. 3, 2022

(30) Foreign Application Priority Data
Dec. 27, 2018    (JP) .................. 2018-245201

(51) Int. Cl.
*B60W 50/02*    (2012.01)
*B60W 40/09*    (2012.01)

(52) U.S. Cl.
CPC ........ *B60W 50/0205* (2013.01); *B60W 40/09* (2013.01); *B60W 2050/0215* (2013.01)

(58) Field of Classification Search
CPC ............ B60W 50/0205; B60W 40/09; B60W 2050/0215; B62D 5/0484; B62D 5/049; G01D 3/0365; G01L 5/221; G01L 25/003
See application file for complete search history.

(56) References Cited

U.S. PATENT DOCUMENTS

| | | |
|---|---|---|
| 5,360,077 A | 11/1994 | Nishimoto et al. |
| 8,471,388 B2 | 6/2013 | Lin et al. |

(Continued)

FOREIGN PATENT DOCUMENTS

| | | |
|---|---|---|
| JP | 06-056045 | 3/1994 |
| JP | 2011-078221 A | 4/2011 |

(Continued)

OTHER PUBLICATIONS

U.S. Appl. No. 17/423,681, filed Jul. 16, 2021, Hitachi Astemo Ltd.

(Continued)

*Primary Examiner* — Jeff A Burke
*Assistant Examiner* — Sihar A Karwan
(74) *Attorney, Agent, or Firm* — FOLEY & LARDNER LLP

(57) ABSTRACT

According to one aspect of the present invention, a control apparatus for an in-vehicle apparatus includes a first sensor and a second sensor configured to output sensor data, and a first microprocessor and a second microprocessor. A second sensor data request signal generation portion of the second microprocessor is configured to generate a second sensor data request signal. The first microprocessor includes a first sensor data request signal generation portion, a first data comparison portion, a first abnormality determination portion, and a first instruction signal generation portion. The first sensor data request signal generation portion is configured to generate a first sensor data request signal. The first data comparison portion is configured to compare first (Continued)

comparison data selected from a plurality of an first sensor data and second comparison data selected from a plurality of an second sensor data. The first abnormality determination portion is configured to determine whether an abnormality has occurred in an sensor portion based on a result of the comparison by the first data comparison portion.

8 Claims, 6 Drawing Sheets

(56) References Cited

U.S. PATENT DOCUMENTS

| | | | |
|---|---|---|---|
| 10,466,122 | B2 | 11/2019 | Nakamura et al. |
| 10,717,462 | B2 | 7/2020 | Oka et al. |
| 11,084,523 | B2 | 8/2021 | Sasaki et al. |
| 2011/0074323 | A1 | 3/2011 | Mukai |
| 2021/0129855 | A1 | 5/2021 | Nakao et al. |
| 2022/0063643 | A1 | 3/2022 | Fujiwara et al. |
| 2022/0111889 | A1 | 4/2022 | Sato |

FOREIGN PATENT DOCUMENTS

| | | | | |
|---|---|---|---|---|
| JP | 2018-106513 A | 7/2018 | | |
| JP | 2018-146512 A | 9/2018 | | |
| WO | WO-2018051550 A1 * | 3/2018 | ............... | B62D 5/04 |

OTHER PUBLICATIONS

International Preliminary Report on Patentability dated Jul. 29, 2021 issued in International Application No. PCT/JP2019/047213, with English translation, 11 pages.

International Search Report on International Patent Application No. PCT/JP2019/047213 dated Mar. 3, 2020 (5 pages).

Non-Final Office Action on U.S. Appl. No. 17/423,681 dated Apr. 25, 2023.

International Search Report dated Jan. 21, 2020 issued in International Application No. PCT/JP2019/050046, with English translation, 6 pages.

Written Opinion of the International Searching Authority dated Jan. 21, 2020 issued in International Application No. PCT/JP2019/050046, with English translation, 12 pages.

Notice of Allowance on U.S. Appl. No. 17/423,681 dated Jul. 24, 2023.

* cited by examiner

CONTROL APPARATUS FOR IN-VEHICLE APPARATUS

TECHNICAL FIELD

The present invention relates to a control apparatus for an in-vehicle apparatus.

BACKGROUND ART

As this kind of technique, there is disclosed a technique discussed in the following patent literature, PTL 1. PTL 1 discloses a power steering apparatus including a plurality of sensors, a plurality of microprocessors, and output devices as many as the plurality of microprocessors.

CITATION LIST

Patent Literature

PTL 1: Japanese Patent Application Public Disclosure No. 2011-78221

SUMMARY OF INVENTION

Technical Problem

According to the technique discussed in PTL 1, at least one signal among the plurality of sensors is input to the plurality of microprocessors in common.

Therefore, this technique has such a problem that the timing of acquiring the signal of each of the sensors cannot be controlled by one microprocessor, and therefore each of the microprocessors cannot acquire pieces of data that the plurality of sensors detects at the same timing, thereby having to compare data pieces acquired at unsynchronized timings and failing to achieve an accurate comparison when carrying out a redundant comparison.

Solution to Problem

One of objects of the present invention is to provide a control apparatus for an in-vehicle apparatus that can carry out a redundant comparison with improved accuracy.

According to one aspect of the present invention, a control apparatus for an in-vehicle apparatus includes a sensor portion and a microprocessor portion. The sensor portion includes a first sensor and a second sensor. The first sensor is configured to detect a driving state of a vehicle and output first sensor data. The second sensor is configured to detect the driving state of the vehicle that is the same detection target as the first sensor, and output second sensor data. The microprocessor portion includes a first microprocessor and a second microprocessor. The second microprocessor includes a second sensor data request signal generation portion. The second sensor data request signal generation portion is configured to generate a second sensor data request signal. The second sensor data request signal is a data signal including information requesting the second sensor to transmit the second sensor data to the microprocessor portion and transmitted from the second microprocessor to the second sensor and the first microprocessor a plurality of times within a predetermined period. The first microprocessor includes a first sensor data request signal generation portion, a first data comparison portion, a first abnormality determination portion, and a first instruction signal generation portion. The first sensor data request signal generation portion is configured to generate a first sensor data request signal. The first sensor data request signal is a data signal including information requesting the first sensor to transmit the first sensor data to the microprocessor portion and transmitted from the first microprocessor to the first sensor a plurality of times within a predetermined period. The first data comparison portion is configured to compare first comparison data selected from a plurality of pieces of the first sensor data transmitted to the microprocessor portion a plurality of times according to the second sensor data request signal, and second comparison data selected from a plurality of pieces of the second sensor data transmitted to the microprocessor portion a plurality of times according to the second sensor data request signal. The first abnormality determination portion is configured to determine whether an abnormality has occurred in the sensor portion based on a result of the comparison by the first data comparison portion. The first instruction signal generation portion is configured to generate a first instruction signal for driving and controlling an actuator based on the first sensor data.

Advantageous Effects of Invention

Therefore, according to the one aspect of the present invention, the redundant comparison can be carried out with improved accuracy.

DESCRIPTION OF EMBODIMENTS

First Embodiment

Figure 1:
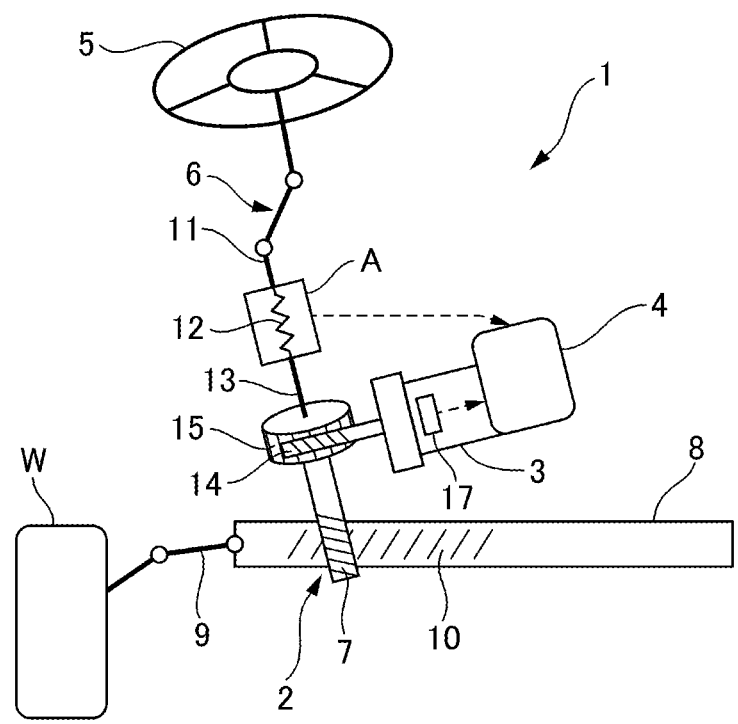
FIG. 1 is a configuration diagram that is a diagram illustrating a steering apparatus to which the present invention is applied.

FIG. 1 is a configuration diagram that is a diagram illustrating a steering apparatus to which the present invention is applied.

A steering apparatus 1 (an in-vehicle apparatus) is mounted on a vehicle that uses an engine as a power source thereof. The steering apparatus 1 includes a steering mechanism 2, an electric motor (an actuator) 3, and a control device 4.

The steering mechanism 2 turns a front wheel W, which is a turning target wheel. The steering mechanism 2 includes a steering wheel 5, a steering shaft 6, a pinion 7, a rack bar 8, and a tie rod 9.

A steering torque input to the steering wheel 5 is transmitted from the steering shaft 6 to the pinion 7, and is converted into a thrust force of the rack bar 8 by a rack 10 meshed with the pinion 7. The linear motion of the rack bar 8 is transmitted to the tie rod 9, and the front wheel W is turned.

The steering shaft 6 includes an input shaft 11, a torsion bar 12, and a pinion shaft 13. The input shaft 11 and the pinion shaft 13 are rotatable relative to each other with the aid of a torsion of the torsion bar 12.

The electric motor 3 is, for example, a three-phase brushless motor. An assist torque output from the electric motor 3 is transmitted to the pinion 7 via a worm shaft 14 and a worm wheel 15.

A sensor portion A is installed on the steering shaft 6. The sensor portion A extends across the input shaft 11 and the pinion shaft 13 and detects the steering torque.

Figure 2:
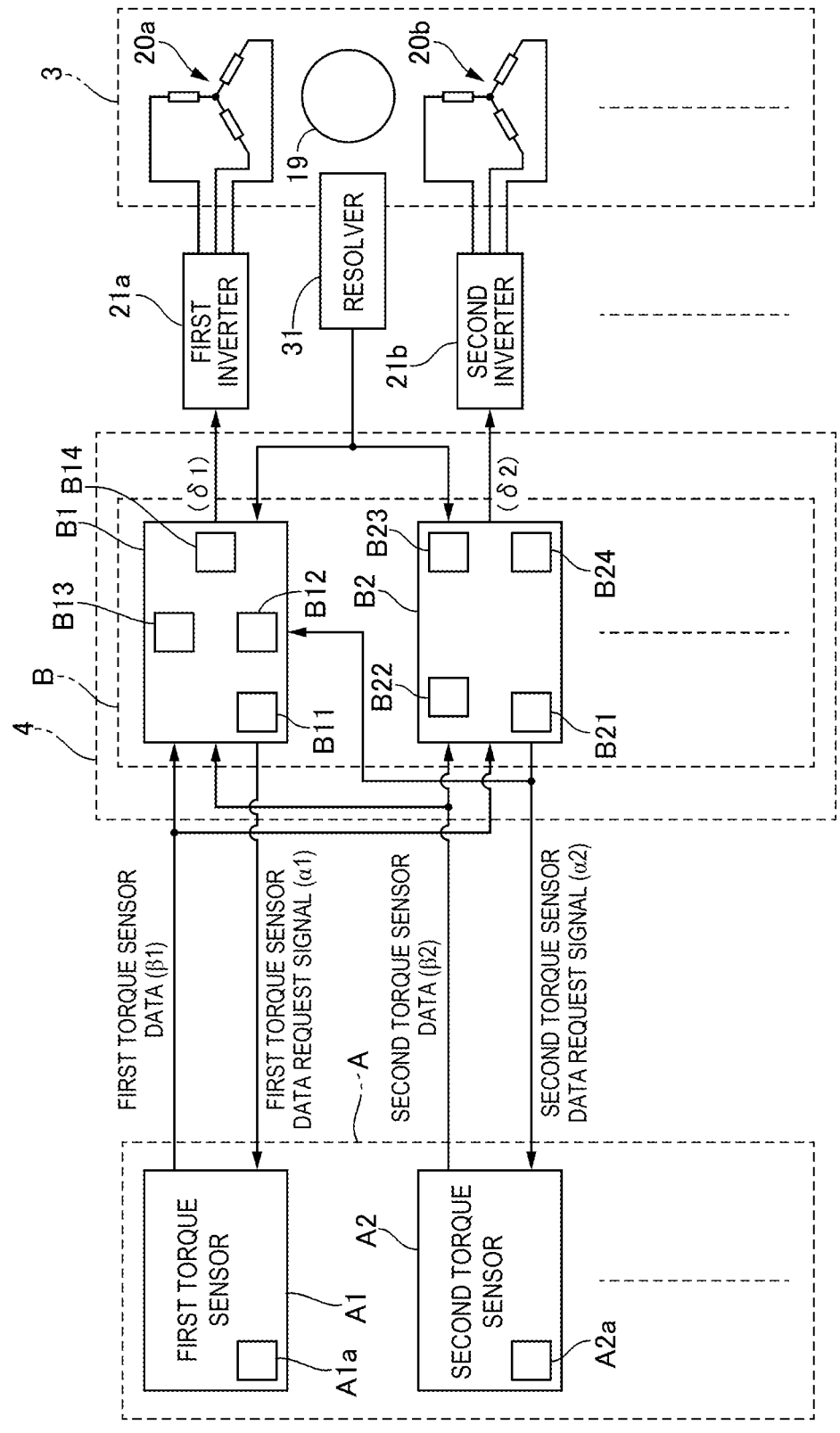
FIG. 2 illustrates the configuration of a control system of a steering apparatus 1 according to a first embodiment.

The sensor portion A includes a plurality of torque sensors that detects the torsion of the torsion bar 12, and includes at least a first torque sensor (a first sensor) A1 and a second torque sensor (a second sensor) A2 (refer to FIG. 2).

[Configuration of Control System]

FIG. 2 illustrates the configuration of a control system of the steering apparatus 1.

The electric motor 3 is a double three-phase motor including a first stator coil 20a and a second stator coil 20b around the outer periphery of one rotor 19.

The maximum motor output is the same between when electric power is supplied only to the first stator coil 20a and when electric power is supplied to only the second stator coil 20b.

The electric motor 3 outputs the assist torque according to an electric current supplied from a first inverter 21a or a second inverter 21b.

A microprocessor portion B, which forms the control device 4, includes a plurality of microprocessors. The microprocessor portion B includes a first microprocessor B1, which supplies electric power to the first stator coil 20a, and a second microprocessor B2, which supplies electric power to the second stator coil 20b, thereby having at least two control systems.

The first microprocessor B1 includes a first torque sensor data request signal generation portion (a first sensor data request signal generation portion) B11, a first torque sensor data comparison portion (a first data comparison portion) B12, a first abnormality determination portion B13, and a first instruction signal generation portion B14.

The first torque sensor data request signal generation portion B11 generates a first torque sensor data request signal (a first sensor data request signal) $\alpha 1$.

The first torque sensor data comparison portion B12 carries out a redundant comparison between one piece of first comparison data $\gamma 1$ that is selected from a plurality of pieces of first torque sensor data (first sensor data) $\beta 1$ transmitted to the first microprocessor B1 a plurality of times based on the first torque sensor data request signal $\alpha 1$, and one piece of second comparison data $\gamma 2$ that is selected from a plurality of pieces of second torque sensor data (second sensor data) $\beta 2$ transmitted to the first microprocessor B1 a plurality of times based on a second torque sensor data request signal (a second sensor data request signal) $\alpha 2$.

The first torque sensor data comparison portion B12 may select two or more pieces of torque sensor data from each of the plurality of pieces of first torque sensor data $\beta 1$ and the plurality of pieces of second torque sensor data $\beta 2$.

The first abnormality determination portion B13 determines whether an abnormality has occurred in the sensor portion A based on the result of the comparison by the first torque sensor data comparison portion B12.

The first instruction signal generation portion B14 generates a first instruction signal $\delta 1$, which drives and controls the electric motor 3, based on the first torque sensor data $\beta 1$.

The second microprocessor B2 includes a second torque sensor data request signal generation portion (a second sensor data request signal generation portion) B21, a second torque sensor data comparison portion B22, a second abnormality determination portion B23, and a second instruction signal generation portion B24.

The second torque sensor data request signal generation portion B21 generates the second torque sensor data request signal $\alpha 2$.

The second torque sensor data comparison portion B22 carries out a redundant comparison between one piece of first comparison data $\gamma 2$ that is selected from a plurality of pieces of second torque sensor data $\beta 2$ transmitted to the second microprocessor B2 a plurality of times based on the second torque sensor data request signal $\alpha 2$, and one piece of first comparison data $\alpha 1$ that is selected from a plurality of pieces of first torque sensor data $\beta 1$ transmitted to the second microprocessor B2 a plurality of times based on the first torque sensor data request signal $\alpha 1$.

The second abnormality determination portion B23 determines whether an abnormality has occurred in the sensor portion A based on the result of the comparison by the second torque sensor data comparison portion B22.

The second instruction signal generation portion B24 generates a second instruction signal $\delta 2$, which drives and controls the electric motor 3, based on the second torque sensor data $\beta 2$.

Further, the sensor portion A is also configured as two systems by including a first torque sensor A1 and a second torque sensor A2 as described above.

The first torque sensor A1 and the second torque sensor A2 include a first torque sensor self-diagnosis portion (a first sensor self-diagnosis portion) A1a, which determines whether an abnormality has occurred in the first torque sensor A1, and a second torque sensor self-diagnosis portion (a second sensor self-diagnosis portion) A2a, which determines whether an abnormality has occurred in the second torque sensor A2, respectively.

Further, the first torque sensor data $\beta 1$ includes first self-diagnosis data $\mu 1$, which is the result of the diagnosis by the first torque sensor self-diagnosis portion A1a, and the second torque sensor data $\beta 2$ includes second self-diagnosis data $\mu 2$, which is the result of the diagnosis by the second torque sensor self-diagnosis portion A2a.

Therefore, the first torque sensor data comparison portion B12 and the second torque sensor data comparison portion B22 do not select the first torque sensor data $\beta 1$ including the first self-diagnosis data $\mu 1$ indicating an abnormality in the first torque sensor A1 as the first comparison data $\alpha 1$, and, further, do not select the second torque sensor data $\beta 2$ including the second self-diagnosis data $\mu 2$ indicating an abnormality in the second torque sensor A2 as the second comparison data $\gamma 2$.

Due to this configuration, the control system can reduce an unnecessary calculation load on the first torque sensor data comparison portion B12 and the second torque sensor data comparison portion B22, and also can further reduce a risk of a false determination by the first abnormality determination portion B13 and the second abnormality determination portion B23 because being prevented from making the comparison based on abnormal data.

The first torque sensor A1 outputs the first torque sensor data signal $\beta 1$ according to the steering torque to the first microprocessor B1 and the second microprocessor B2.

The second torque sensor A2 outputs the second torque sensor data signal $\beta 2$ according to the steering torque to the second microprocessor B2 and the first microprocessor B1.

A resolver 17, which detects the rotational angle of the rotor 19, is mounted inside the electric motor 3. The resolver 17 outputs a motor rotational angle signal according to the rotational angle of the rotor 19 to the first microprocessor B1 and the second microprocessor B2.

The first microprocessor B1 and the second microprocessor B2 in the microprocessor portion B perform power steering control of calculating a target assist torque according to the torque signal, the motor rotational angle signal, and another signal indicating the vehicle state (for example, the vehicle speed signal), and controlling electric power to supply to the electric motor 3 in such a manner that the torque output from the electric motor 3 matches the target assist torque.

In other words, the first microprocessor B1 outputs the first instruction signal δ1 generated by the first instruction signal generation portion B14 to the first inverter 21*a*, and the second microprocessor B2 outputs the second instruction signal δ2 generated by the second instruction signal generation portion B24 to the second inverter 21*b*, thereby controlling the electric power to supply to the electric motor 3.

The inverters 21*a* and 21*b* convert direct-current electric power fed from a not-illustrated battery into alternating-current electric power based on the instruction signals δ1 and δ2, and supply them to the first stator coil 20*a* and the second stator coil 20*b* of the electric motor 3, respectively.

Each of the inverters 21*a* and 21*b* includes a three-phase bridge circuit using two pairs of MOSFETs, which are switching elements, for each phase. Each of the MOSFETs is controlled to be switched on/off based on a motor instruction signal input to a control terminal (a gate terminal) of the MOSFET.

Each of the first torque sensor A1 and the second torque sensor A2 of the sensor portion A is, for example, a magnetostrictive sensor, and includes a Hall IC that outputs a torque signal according to the steering torque.

Each of the first torque sensor A1 and the second torque sensor A2 of the sensor portion A holds an analog signal output from the Hall IC per predetermined cycle, and encodes it into a digital signal and transmits it to the first microprocessor B1 and the second microprocessor B2.

Each of the first torque sensor A1 and the second torque sensor A2 of the sensor portion A encodes the analog signal into a SENT message based on the so-called SENT (Single Edge Nibble Transmission) protocol in compliance with the Society of Automotive Engineers standard SAE-J2716, and outputs it. The SENT protocol is asynchronous serial communication connected from a transmitter (the sensor) to a receiver (the microprocessor portion B) in a point-to-point manner.

More specifically, when the first torque sensor A1 receives the first torque sensor data request signal α1 from the first microprocessor B1, which is a data signal transmitted a plurality of times within a predetermined period, the first torque sensor A1 transmits the first torque sensor data β1 detected at the timing of this reception to the first microprocessor B1 and the second microprocessor B2.

Similarly, when the second torque sensor A2 receives the second torque sensor data request signal α2 from the second microprocessor B2, which is a data signal transmitted a plurality of times within a predetermined period, the second torque sensor A2 transmits the second torque sensor data β2 detected at the timing of this reception to the second microprocessor B2 and the first microprocessor B1.

The second torque sensor data request signal α2 from the second microprocessor B2 is also transmitted to the first microprocessor B1.

Further, the first torque sensor data comparison portion B12 carries out the redundant comparison between the first comparison data α1 and the second comparison data γ2, which are pieces of sensor data closest to each other in terms of the timings of detecting the first torque sensor data β1 by the first torque sensor A1 and the second torque sensor data β2 by the second torque sensor A2 based on the second torque sensor data request signal α2.

It is preferable to compare the pieces of torque sensor data closest to each other, but the compared pieces of torque sensor data do not necessarily have to be the pieces of torque sensor data closest to each other in terms of the detection timings.

Due to this configuration, the control system can reduce such a risk that the first abnormality determination portion B13 falsely determines that the sensor portion A is abnormal despite the fact that the first torque sensor A1 and the second torque sensor A2 are normal.

Next, the advantageous effects will be described.

The control apparatus for the in-vehicle apparatus according to the first embodiment brings about advantageous effects that will be listed below.

(1) The first torque sensor data comparison portion B12 of the first microprocessor B1 is configured to carry out the redundant comparison between the first comparison data α1 and the second comparison data γ2, which are the pieces of sensor data detected by the first torque sensor A1 and the second torque sensor A2 at close timings to each other based on the second torque sensor data request signal α2.

Therefore, the control system can reduce such a risk that the first abnormality determination portion B13 falsely determines that the sensor portion A is abnormal despite the fact that the first torque sensor A1 and the second torque sensor A2 are normal.

(2) The first torque sensor data comparison portion B12 of the first microprocessor B1 and the second torque sensor data comparison portion B22 of the second microprocessor B2 are configured not to select the first torque sensor data signal β1 including the first self-diagnosis data n1 indicating an abnormality in the first torque sensor A1 as the first comparison data α1, and, further, not to select the second torque sensor data β2 including the second self-diagnosis data μ2 indicating an abnormality in the second torque sensor A2 as the second comparison data γ2.

Therefore, the control system can reduce an unnecessary calculation load on the first torque sensor data comparison portion B12 and the second torque sensor data comparison portion B22, and also can further reduce the risk of the false determination by the first abnormality determination portion B13 and the second abnormality determination portion B23 because being prevented from making the comparison based on abnormal data.

Second Embodiment

Figure 3:
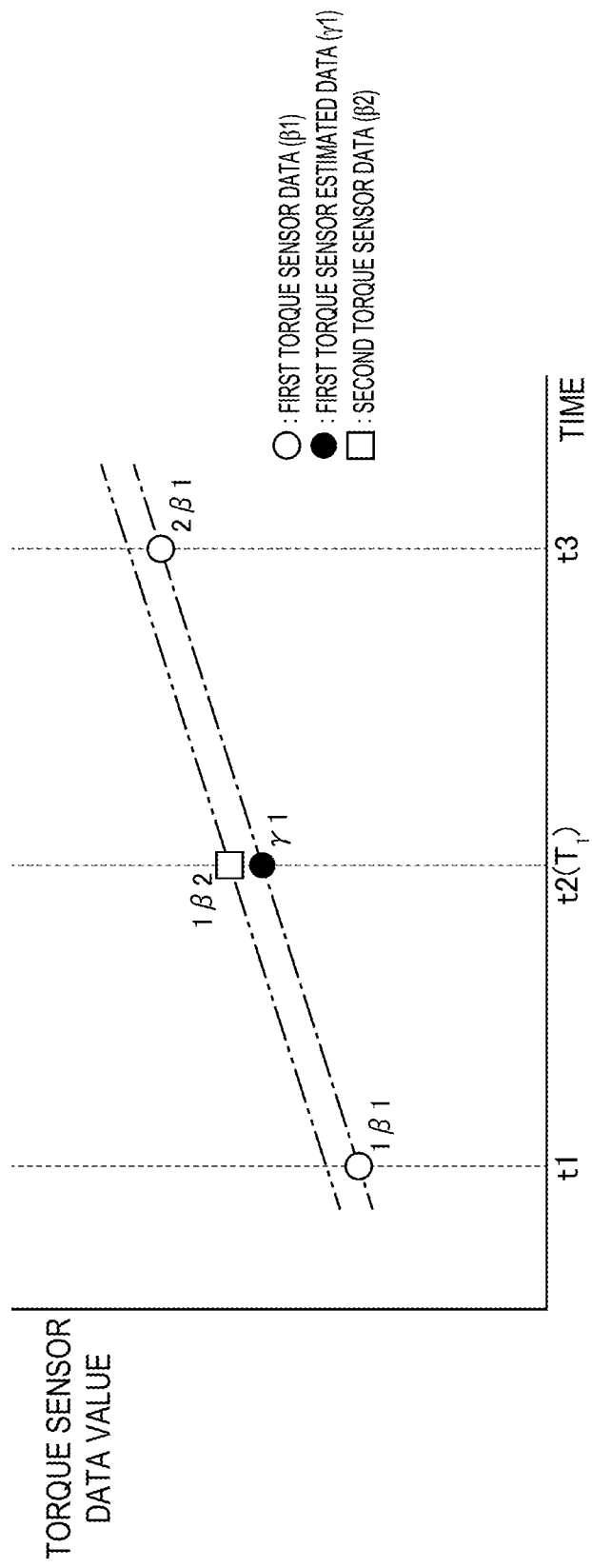
FIG. 3 is a timing chart illustrating a method for calculating an estimated value of one of pieces of data in a redundant comparison according to a second embodiment.

FIG. 3 is a timing chart illustrating a method for calculating an estimated value of one of pieces of data in a redundant comparison according to a second embodiment.

The vertical axis and the horizontal axis represent the torque sensor data value and the time, respectively.

In the first embodiment, the first torque sensor data comparison portion B12 compares the first comparison data α1 and the second comparison data γ2, which are the pieces of torque sensor data closest to each other in terms of the timings of detecting the first torque sensor data β1 by the first torque sensor data A1 and the second torque sensor data β2 by the second torque sensor A2 based on the second torque sensor data request signal α2. On the other hand, in the second embodiment, the first torque sensor data comparison portion B12 estimates a timing t2 (T1) at which the second torque sensor A2 outputs second torque sensor data 1(32 as the second comparison data γ2 based on the timing at which the first microprocessor B1 receives the second torque sensor data request signal α2.

Further, the first torque sensor data comparison portion B12 estimates and generates the first comparison data α1 corresponding to the timing t2 by conducting a linear interpolation between first torque sensor data 1β1 at a timing t1 and first torque sensor data 2β1 at a timing t3.

Other than that, the second embodiment is configured similarly to the first embodiment, and therefore will be further described assigning the same reference numerals to similar components and omitting the descriptions thereof.

The redundant comparison is carried out between this estimated and generated first comparison data α1 and the second torque sensor data 1β1 as the second comparison data γ2.

Alternatively, the first torque sensor data request generation portion B11 may transmit the first torque sensor data request signal α1 to the first torque sensor A1 based on the reception of the second torque sensor data request signal α2 by the first microprocessor B1, and the first torque sensor data β1 at the timing t2 may be acquired thereby, instead of the linear interpolation.

Due to this configuration, even when the first microprocessor B1 and the second microprocessor B2 output the first torque sensor data request signal α1 and the second torque sensor data request signal α2 at their individual timings, respectively, the control system can select the first comparison data α1 and the second comparison data γ2 appropriately and can also use the first comparison data α1 and the second comparison data γ2 detected at further closer timings, thereby further reducing the risk of the false determination by the first abnormality determination portion B13.

Figure 4:
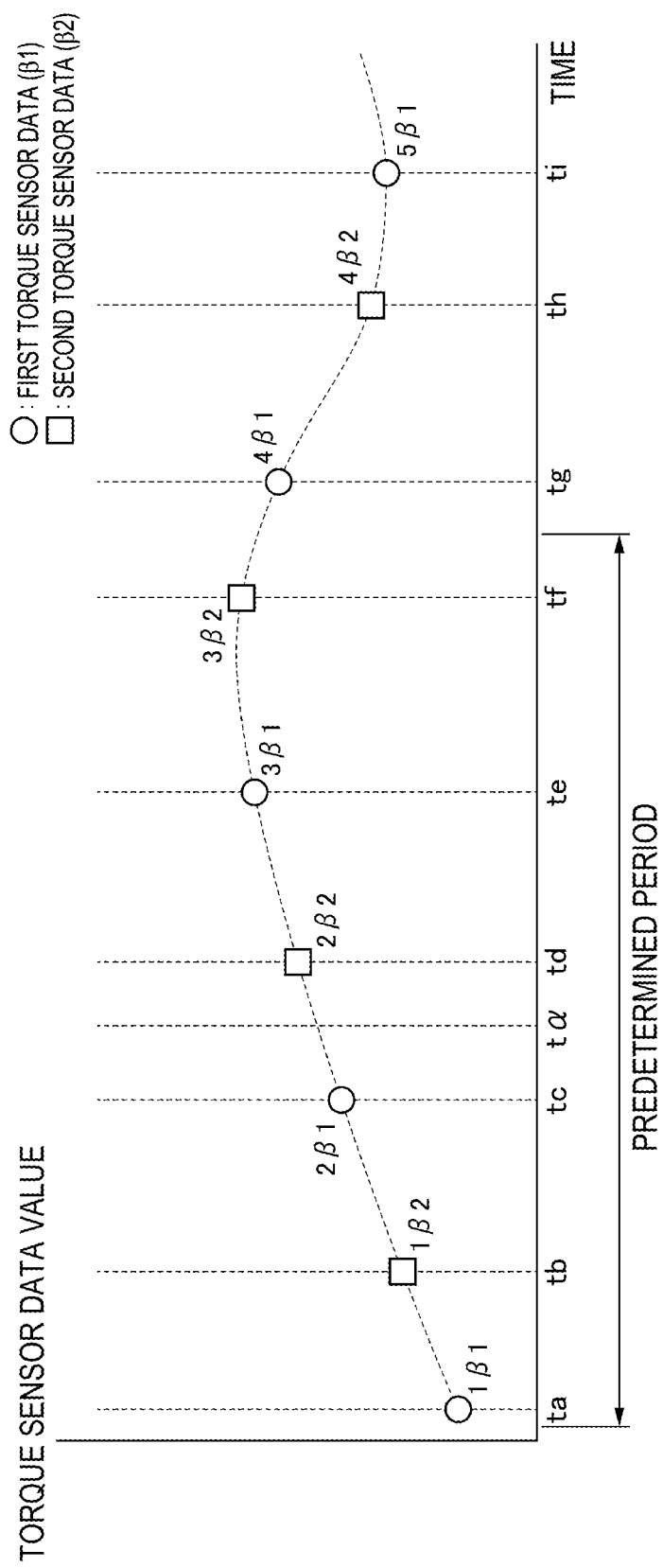
FIG. 4 is a timing chart illustrating one example of the redundant comparison according to the second embodiment.

FIG. 4 is a timing chart illustrating one example of the redundant comparison according to the second embodiment.

The vertical axis and the horizontal axis represent the torque sensor data value and the time, respectively.

The chronological data of the first torque sensor data β1 transmitted within a predetermined period is assumed to be three pieces of data starting from the first torque sensor data 1β1 and including as far as the first torque sensor data 3β1. Similarly, the chronological data of the second torque sensor data β2 transmitted within the predetermined period is assumed to be three pieces of data starting from the second torque sensor data 1β2 and including as far as the second torque sensor data 3β2.

Therefore, as illustrated in FIG. 4, when the timings of detecting the chronological data of the first torque sensor data β1 by the first torque sensor A1 and the timings of detecting the chronological data of the second torque sensor data β2 by the second torque sensor A2 are in such a relationship that they are detected in the order of the first torque sensor data 1β1, the second torque sensor data 1β2, the first torque sensor data 2β1, the second torque sensor data 2β2, the first torque sensor data 3β1, and the second torque sensor data 3β2, the first torque sensor data comparison portion B12 selects the second torque sensor data 1β2 at a timing tb as the second comparison data γ2 based on the second torque sensor data request signal α2. Further, when the first microprocessor B1 does not acquire the whole data of the second torque sensor data 1β2, the first torque sensor data comparison portion B12 compares the first comparison data α1 at the timing tb, which is estimated and generated by conducting the linear interpolation between the first torque sensor data 1β1 at a timing ta and the first torque sensor data 2β1 at a timing tc as described above, and the second torque sensor data 1β2 as the second comparison data γ2 at the timing tb, after waiting for the acquisition of the whole data of the second torque sensor data 1β2 by the first microprocessor B1 (the timing tα).

In the case where the signal transmission method is SENT, a long data communication period is required when the data has a large value. Therefore, the first microprocessor B1 may also be unable to acquire the whole data of the second torque sensor data 1β2 at the timing tc when the first torque sensor data 2β1 is detected. Even in such a case, due to the present configuration, the first torque sensor data comparison portion B12 compares the first torque sensor data β1 and the second torque sensor data β2 after waiting for the acquisition of the whole data of the second torque sensor data 1β2 (the timing tα) by the first microprocessor B1, thereby being able to prevent something from being missed in the comparison data γ.

Next, the advantageous effects will be described.

The control apparatus for the in-vehicle apparatus according to the second embodiment brings about advantageous effects that will be listed below, in addition to the advantageous effects of the first embodiment.

(1) The first torque sensor data comparison portion B12 is configured to estimate and generate the first comparison data α1 corresponding to the timing t2 (T1) by conducting the linear interpolation between the first torque sensor data 1β1 at the timing t1 and the first torque sensor data 2β1 at the timing t2, and carry out the redundant comparison between this estimated and generated first comparison data α1 and the second torque sensor data 1β2 as the second comparison data γ2. Alternatively, the control system is configured in such a manner that the first torque sensor data request generation portion B11 transmits the first torque sensor data request signal α1 to the first torque sensor A1 based on the reception of the second torque sensor data request signal α2 by the first microprocessor B1, and the first torque sensor data β1 as the first comparison data α1 at the timing t2 (T1) is acquired and the redundant comparison is carried out thereby.

Therefore, even when the first microprocessor B1 and the second microprocessor B2 output the first torque sensor data request signal α1 and the second torque sensor data request signal α2 at their individual timings, respectively, the control system can select the first comparison data α1 and the second comparison data γ2 appropriately and can also use the first comparison data α1 and the second comparison data γ2 detected at further closer timings, thereby further reducing the risk of the false determination by the first abnormality determination portion B13.

(2) The first torque sensor data comparison portion B12 is configured to select the second torque sensor data 1β2 as the second comparison data γ2 based on the second torque sensor data request signal α2, and compare the first comparison data α1 at the timing tb, which is estimated and generated by conducting the linear interpolation between the first torque sensor data 1β1 at the timing ta and the first torque sensor data 2β1 at the timing tc, and the second torque sensor data 1β2 as the second comparison data γ2 at the timing tb after waiting for the acquisition of the whole data of the second torque sensor data 1β2 by the first microprocessor B1 (the timing tα) when the first microprocessor B1 does not acquire the while data of the second torque sensor data 1β2.

In the case where the signal transmission method is SENT, a long data communication period is required when the data has a large value. Therefore, the first microprocessor B1 may also be unable to acquire the whole data of the second torque sensor data 1β2 at the timing tc when the first torque sensor data 2β1 is detected. Even in such a case, due to the present configuration, the first torque sensor data comparison portion B12 carries out the redundant comparison between the first torque sensor data β1 and the second torque sensor data β2 after waiting for the acquisition of the whole data of the second torque sensor data 1β2 by the first microprocessor B1 (the timing tα), thereby being able to prevent something from being missed in the comparison data γ.

Third Embodiment

Figure 5:
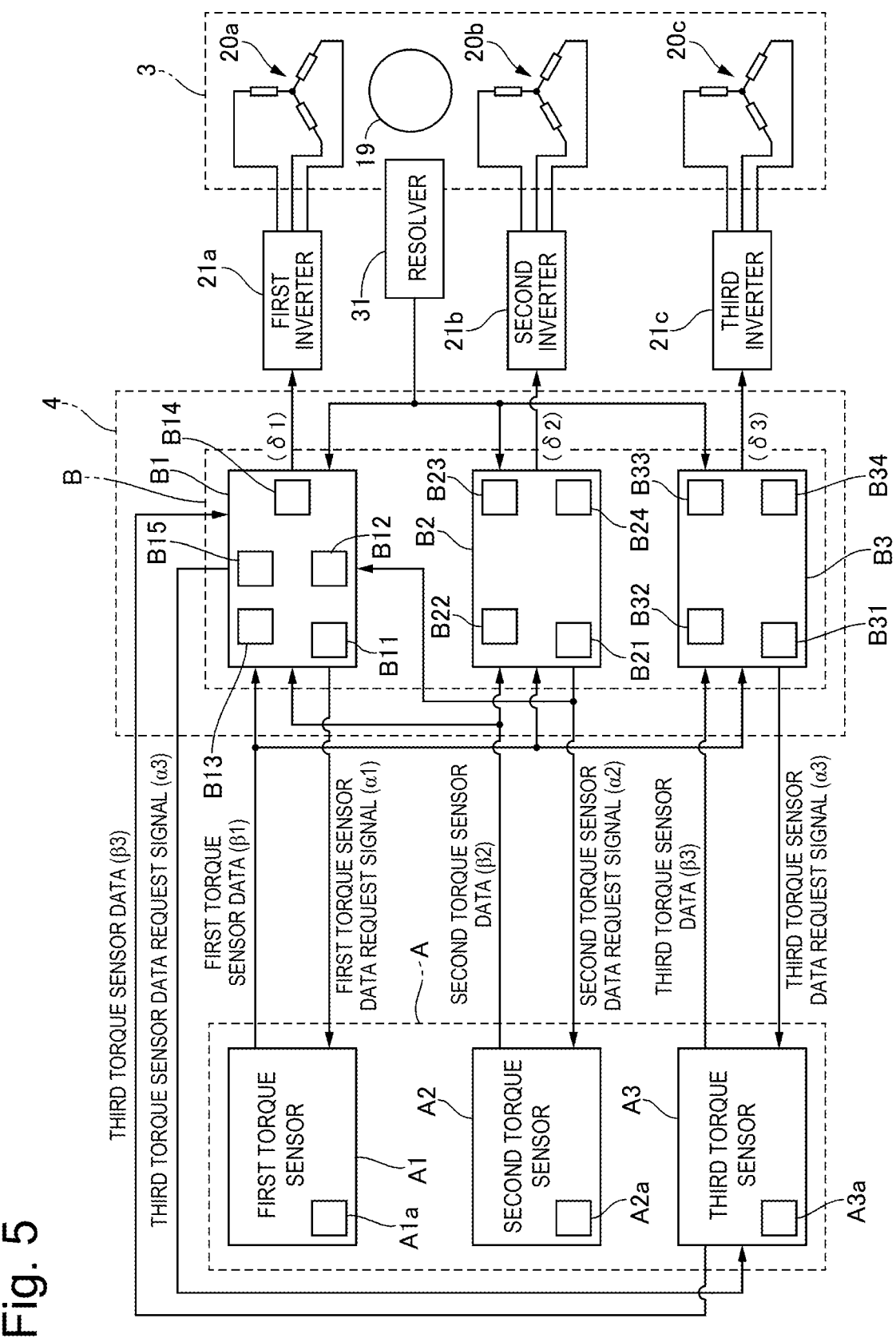
FIG. 5 illustrates the configuration of a control system of a steering apparatus 1 according to a third embodiment.

FIG. 5 illustrates the configuration of a control system of a steering apparatus 1 according to a third embodiment.

Unlike the first embodiment, the electric motor 3 is a triple three-phase brushless motor including the first stator coil 20a, the second stator coil 20b, and a third stator coil 20c disposed around the outer periphery of the single rotor 19.

Therefore, the steering apparatus 1 includes a third inverter 21c, a third torque sensor data request signal generation portion (a third sensor data request signal generation portion) B31, which generates a third torque sensor data request signal α3, a third torque sensor data comparison portion B32, a third abnormality determination portion B33, and a third instruction signal generation portion B34, which generates a third instruction signal δ3 for driving and controlling the electric motor 3, and includes a third microprocessor B3, which supplies electric power to the third stator coil 20c, and a third torque sensor self-diagnosis portion A3a. The steering apparatus 1 additionally includes a third torque sensor A3, which detects the torsion of the torsion bar 12 and outputs third torque sensor data (third sensor data) β3 to the third microprocessor B3.

The third microprocessor B3 also receives the first torque sensor data β1, and the third torque sensor data comparison portion B32 carries out the redundant comparison between the third torque sensor data β3 and the first torque sensor data β1.

Further, the first microprocessor B1 includes a third torque sensor data request signal generation portion (the third sensor data request signal generation portion) B15, and the third torque sensor data request signal generation portion B15 generates the third torque sensor data request signal (the third sensor data request signal) α3.

The third torque sensor data request signal α3 is a data signal including information requesting the third torque sensor A3 to transmit the third torque sensor data β3 to the first microprocessor B1 and transmitted a plurality of times within a predetermined period.

The first data comparison portion B12 carries out the redundant comparison among third comparison data γ3 that is selected from a plurality of pieces of third torque sensor data β3 transmitted to the first microprocessor B1 a plurality of times based on the third torque sensor data request signal α3, the first comparison data α1, and the second comparison data γ2, and makes a determination based on a majority vote.

Other than that, the third embodiment is configured similarly to the first embodiment, and therefore will be further described assigning the same reference numerals to similar components and omitting the descriptions thereof.

Due to this configuration, the control system can identify an abnormal portion by making the determination based on the majority vote among the three or more pieces of comparison data γ, thereby driving and controlling the electric motor 3 based on normal data.

Next, the advantageous effects will be described.

The control apparatus for the in-vehicle apparatus according to the third embodiment brings about advantageous effects that will be listed below, in addition to the advantageous effects of the first embodiment.

(1) The first data comparison portion B12 is configured to carry out the redundant comparison among the third comparison data γ3 that is selected from the plurality of pieces of third torque sensor data β3 transmitted to the first microprocessor B1 the plurality of times based on the third torque sensor data request signal α3, the first comparison data α1, and the second comparison data γ2, and makes the determination based on the majority vote.

Therefore, the control system can identify an abnormal portion by making the determination based on the majority vote among the three or more pieces of comparison data γ, thereby driving and controlling the electric motor 3 based on normal data.

Fourth Embodiment

Figure 6:
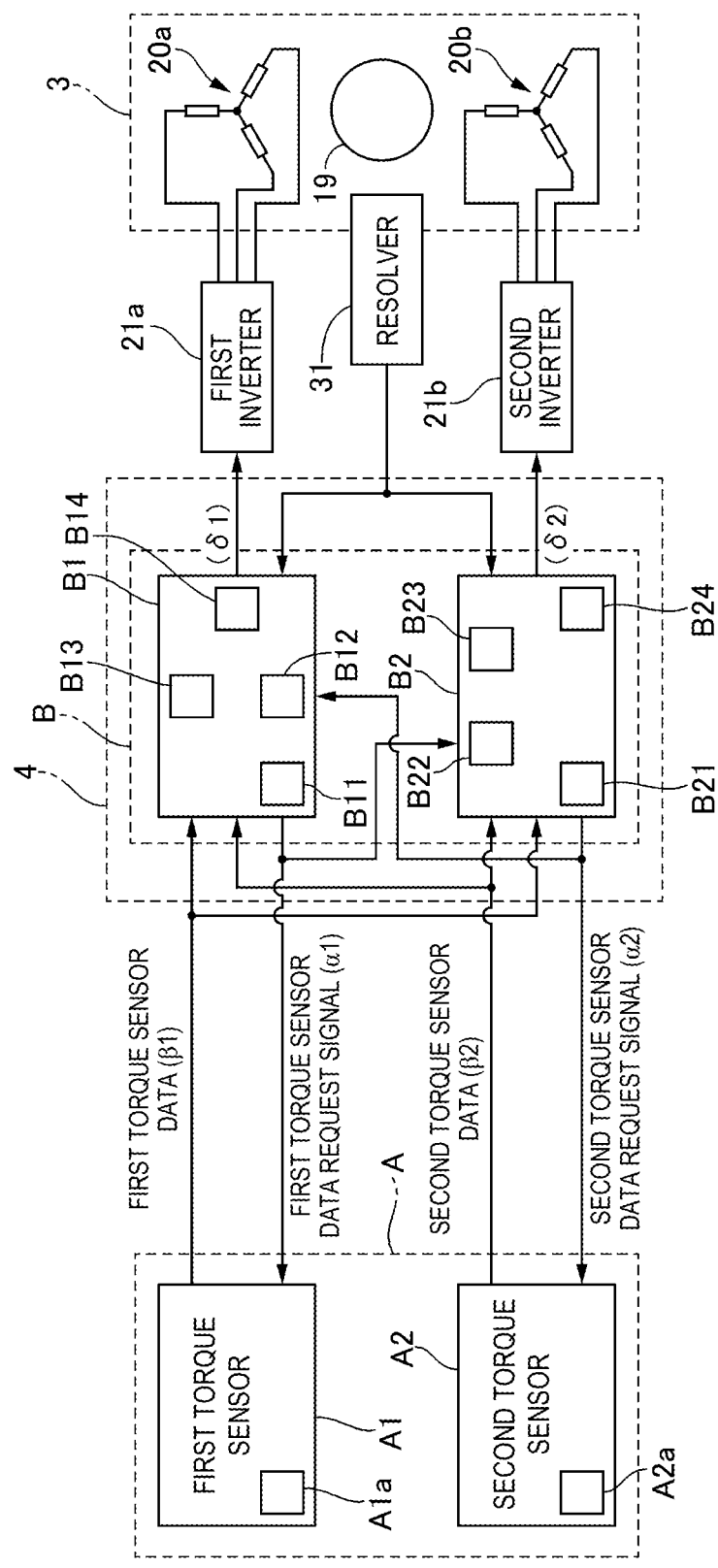
FIG. 6 illustrates the configuration of a control system of a steering apparatus 1 according to a fourth embodiment.

FIG. 6 illustrates the configuration of a control system of a steering apparatus 1 according to a fourth embodiment.

Unlike the first embodiment, the first torque sensor data request signal α1 from the first torque sensor data request signal generation portion B11 of the first microprocessor B1 is transmitted to not only the first torque sensor A1 but also the second microprocessor B2.

Other than that, the fourth embodiment is configured similarly to the first embodiment, and therefore will be further described assigning the same reference numerals to similar components and omitting the descriptions thereof.

The control apparatus for the in-vehicle apparatus according to the fourth embodiment brings about advantageous effects that will be listed below, in addition to the advantageous effects of the first embodiment.

(1) The control system is configured in such a manner that the first torque sensor data request signal α1 from the first torque sensor data request signal generation portion B11 of the first microprocessor B1 is transmitted to not only the first torque sensor A1 but also the second microprocessor B2.

Therefore, the control system can reduce such a risk that the second abnormality determination portion B23 falsely determines that the sensor portion A is abnormal despite the fact that the first torque sensor A1 and the second torque sensor A2 are normal in the second microprocessor B2 in addition to the first microprocessor B1.

Other Embodiments

Having described the present invention based on the first to fourth embodiments, the specific configuration of each invention is not limited to the first to fourth embodiments, and the present invention also includes even a design modification and the like thereof made within a range that does not deviate from the spirit of the present invention.

In other words, the present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-245201 filed on Dec. 27, 2018. The entire disclosure of Japanese Patent Application No. 2018-245201 filed on Dec. 27, 2018 including the specification, the claims, the drawings, and the abstract is incorporated herein by reference in its entirety.

REFERENCE SIGNS LIST 1 steering apparatus (in-vehicle apparatus)
3 electric motor (actuator)
4 control device
A sensor portion
A1 first torque sensor (first sensor)
A1a first torque sensor self-diagnosis portion (first sensor self-diagnosis portion)
A2 second torque sensor (second sensor)
A2a second torque sensor self-diagnosis portion (second sensor self-diagnosis portion)
A3 third torque sensor (third sensor)
B microprocessor portion
B1 first microprocessor
B11 first torque sensor data request signal generation portion (first sensor data request signal generation portion)
B12 first torque sensor data comparison portion (first data comparison portion)
B13 first abnormality determination portion
B14 first instruction signal generation portion
B15 third torque sensor data request signal generation portion (third sensor data request signal generation portion)
B2 second microprocessor
B21 second torque sensor data request signal generation portion (second sensor data request signal generation portion)
B22 second torque sensor data comparison portion (second data comparison portion)
B23 second abnormality determination portion
B24 second instruction signal generation portion
B3 third microprocessor
B31 third torque sensor data request signal generation portion (third sensor data request signal generation portion)
B34 third instruction signal generation portion
T1 timing at which the second torque sensor data is output (timing at which the second sensor data is output)
α1 first torque sensor data request signal (first sensor data request signal)
α2 second torque sensor data request signal (second sensor data request signal)
α3 third torque sensor data request signal (third sensor data request signal)
β1 first torque sensor data (first sensor data)
β2 second torque sensor data (second sensor data)
β3 third torque sensor data (third sensor data)
γ1 first comparison data
γ2 second comparison data
γ3 third comparison data
δ1 first instruction signal
δ2 second instruction signal
δ3 third instruction signal
μ1 first self-diagnosis data
μ2 second self-diagnosis data

The invention claimed is:

1. A control apparatus for an in-vehicle apparatus including an actuator, the control apparatus comprising:
a sensor portion including a first sensor and a second sensor,
the first sensor being configured to detect a driving state of a vehicle and output first sensor data,
the second sensor being configured to detect the driving state of the vehicle that is the same detection target as the first sensor, and output second sensor data; and
a microprocessor portion including a first microprocessor and a second microprocessor,
the second microprocessor including a second sensor data request signal generation portion,
the second sensor data request signal generation portion being configured to generate a second sensor data request signal,
the second sensor data request signal being a data signal including information requesting the second sensor to transmit the second sensor data to the microprocessor portion and transmitted from the second microprocessor to the second sensor and the first microprocessor a plurality of times within a predetermined period,
the first microprocessor including a first sensor data request signal generation portion, a first data comparison portion, a first abnormality determination portion, and a first instruction signal generation portion,
the first sensor data request signal generation portion being configured to generate a first sensor data request signal,
the first sensor data request signal being a data signal including information requesting the first sensor to transmit the first sensor data to the microprocessor portion and transmitted from the first microprocessor to the first sensor a plurality of times within a predetermined period,
the first data comparison portion being configured to compare first comparison data selected from a plurality of pieces of the first sensor data transmitted to the microprocessor portion a plurality of times according to the first sensor data request signal, and second comparison data selected from a plurality of pieces of the second sensor data transmitted to the microprocessor portion a plurality of times according to the second sensor data request signal,
the first abnormality determination portion being configured to determine whether an abnormality has occurred in the sensor portion based on a result of the comparison by the first data comparison portion,
the first instruction signal generation portion being configured to generate a first instruction signal for driving and controlling the actuator based on the first sensor data.

2. The control apparatus for the in-vehicle apparatus according to claim 1, wherein the first data comparison portion estimates a timing T1 at which the second sensor outputs the second sensor data used as the second comparison data based on a timing at which the first microprocessor receives the second sensor data request signal.

3. The control apparatus for the in-vehicle apparatus according to claim 2, wherein the first data comparison portion generates the first comparison data corresponding to the timing T1 by conducting a linear interpolation among the plurality of pieces of first sensor data.

4. The control apparatus for the in-vehicle apparatus according to claim 1, wherein the first sensor includes a first sensor self-diagnosis portion configured to determine whether an abnormality has occurred in the first sensor,
wherein the first sensor data includes first self-diagnosis data, which is a result of the diagnosis by the first sensor self-diagnosis portion,
wherein the second sensor includes a second sensor self-diagnosis portion configured to determine whether an abnormality has occurred in the second sensor,
wherein the second sensor data includes second self-diagnosis data, which is a result of the diagnosis by the second sensor self-diagnosis portion, and
wherein the first data comparison portion does not select the first sensor data including the first self-diagnosis data indicating the abnormality in the first sensor as the first comparison data and does not select the second sensor data including the second self-diagnosis data indicating the abnormality in the second sensor as the second comparison data.

5. The control apparatus for the in-vehicle apparatus according to claim 1, wherein the sensor portion further includes a third sensor,
wherein the third sensor detects the driving state of the vehicle that is the same detection target as the first sensor, and outputs third sensor data,
wherein the first microprocessor includes a third sensor data request signal generation portion,
wherein the third sensor data request signal generation portion generates a third sensor data request signal,
wherein the third sensor data request signal is a data signal including information requesting the third sensor to transmit the third sensor data to the microprocessor portion and transmitted from the first microprocessor to the third sensor a plurality of times within a predetermined period, and
wherein the first data comparison portion makes a determination based on a majority vote among third comparison data that is selected from a plurality of pieces of the third sensor data transmitted to the microprocessor portion a plurality of times based on the third sensor data request signal, the first comparison data, and the second comparison data.

6. The control apparatus for the in-vehicle apparatus according to claim 5, wherein the first sensor data and the third sensor data are transmitted to the first microprocessor, and
wherein the second sensor data is transmitted to the first microprocessor and the second microprocessor.

7. The control apparatus for the in-vehicle apparatus according to claim 1, wherein the first sensor data request signal generation portion transmits the first sensor data request signal to the first sensor according to reception of the second sensor data request signal by the first microprocessor.

8. The control apparatus for the in-vehicle apparatus according to claim 1, wherein, when chronological data of the first sensor data $\beta 1$ transmitted within a predetermined period is assumed to be n pieces of data including first sensor data $1\beta 1$ to first sensor data $n\beta 1$,
chronological data of the second sensor data $\beta 2$ transmitted within the predetermined period is assumed to be n pieces of data including second sensor data $1\beta 2$ to second sensor data $n\beta 2$, and
timings of detecting the chronological data of the first sensor data by the first sensor and timings of detecting the chronological data of the second sensor data by the second sensor are in such a relationship that they are detected in an order of the first sensor data $1\beta 1$, the second sensor data $1\beta 2$, first sensor data $2\beta 1$, second sensor data $2\beta 2$, first sensor data $3\beta 1$, and second sensor data $3\beta 2$,
the first data comparison portion selects the second sensor data $1\beta 2$ as the second comparison data based on the second sensor data request signal, and compares the first comparison data and the second sensor data $1\beta 2$ as the second comparison data after waiting for acquisition of whole data of the second torque sensor data $1\beta 2$ by the first microprocessor when the first microprocessor does not acquire the whole data of the second sensor data $1\beta 2$.

* * * * *